United States Patent [19]

Seike et al.

[11] Patent Number: 5,012,383

[45] Date of Patent: Apr. 30, 1991

[54] LIGHTNING ARRESTOR INSULATOR AND METHOD OF PRODUCING THE SAME

[75] Inventors: Shoji Seike; Toshiyuki Mima, both of Nagoya; Masayuki Nozaki, Aichi, all of Japan

[73] Assignee: NGK Insulators, Ltd., Nagoya, Japan

[21] Appl. No.: 561,234

[22] Filed: Jul. 27, 1990

Related U.S. Application Data

[63] Continuation of Ser. No. 327,610, Mar. 23, 1989, abandoned.

[30] Foreign Application Priority Data

Mar. 23, 1988 [JP] Japan .................................. 63-67311
Jun. 14, 1988 [JP] Japan ................................ 63-144583

[51] Int. Cl.[5] .............................................. H02H 9/06

[52] U.S. Cl. .................................... 361/120; 361/127; 337/28; 313/325

[58] Field of Search ............... 361/120, 126, 129, 119; 337/28, 34, 32; 313/325, 326

[56] References Cited

FOREIGN PATENT DOCUMENTS 196370 8/1986 European Pat. Off. .
269195 1/1988 European Pat. Off. .
2495827 11/1982 France .
52-17719 4/1977 Japan .
57-160555 10/1982 Japan .
303804 12/1954 Switzerland .

*Primary Examiner*—Todd E. DeBoer
*Attorney, Agent, or Firm*—Parkhurst, Wendel & Rossi

[57] ABSTRACT

An excellent lightning arrestor insulator is provided having a discharge gap portion and an arrestor ZnO element device both built in a body of the insulator, comprising projected discharge electrodes arranged in the inside of the insulator body, the discharge gap portion being formed of a heat resistant protrusion arranged in the inside of the insulator body and surrounding the discharge electrodes, and a pair of metal plates and/or electrically conductive ceramic plates sandwiching the protrusion from both sides thereof and electrically connected to the discharge electrodes, the pair of plates being joined and airtightly sealed to the protrusion via an inorganic glass. The arrestor ZnO element device has a highly reliable airtight fixing and sealing structure so that accidents in a power supply or distribution line at a normal working voltage can be substantially eliminated, and damages caused by hygromeration and lightnings can be noticeably decreased.

9 Claims, 4 Drawing Sheets

LIGHTNING ARRESTOR INSULATOR AND METHOD OF PRODUCING THE SAME

This is a continuation of application Ser. No. 07/327,610 filed Mar. 23, 1989, now abandoned.

BACKGROUND OF THE INVENTION

1. Field of the Invention

The present invention relates to a lightning arrestor insulator having a lightning absorber portion consisting a ZnO element and a discharge gap portion both built in a body of the insulator, and a method of producing the same.

2. Related Art Statement

Heretofore, a lightning arrestor insulator having a lightning absorber portion consisting of a ZnO element and a discharge gap portion both built in a body of the insulator has been known, wherein the discharge gap portion performs discharging at a voltage sufficiently lower than an insulative ensurance of a transformer or a so-called cut-out apparatus to be protected to let off the lightning current to the earth so as to protect the transformer or the like at the time lightning occurs and the ZnO element functions to restore instantaneously the electrical insulation of the gap portion to interrupt the electric current flow after the discharging of the discharge gap portion.

An example of such a lightning arrestor insulator is disclosed in Japanese Utility Model Application Publication No. 52-17,719, wherein the gap portion and the ZnO element are arranged in the insulator body, and the insulator body is capped by a ceramic cap by threading or an O-ring.

However, the lightning arrestor insulator of the Japanese Utility Model Application Publication No. 52-17,719 connects the inside arrangements by mere mechanical means, so that it has a drawback in that, if an air-tight sealing of the ceramic cap is broken, the inside of the insulator body is humidized to incur accidents in a power distribution line at a normal working voltage, particularly due to hygromeration of the discharge gap portion.

Heretofore, a lightning arrestor insulator also has been used having a lightning arrestor function of firmly gripping a power supply line and decreasing accidents in the power supply line at the time of a direct hit by lightning.

An example of such an insulator and a method of producing the same is disclosed in applicants' Japanese Patent Application Laid-Open No. 57-160,555, wherein the ZnO element, which protects the insulator per se from an excessively large electric current at the time lightning hits, is integrally fixed and sealed in the inside of the insulator by means of an inorganic glass. The insulator has a characteristic feature of superior airtight sealing and electric insulation properties.

However, in the method of producing the above insulator, the entire insulator is heated and retained in a large homogeneous heating furnace such as an electric furnace, while casting an inorganic glass thereinto, so that production efficiency is bad and an annealing process and other processes are necessary after casting of the inorganic glass in the insulator. Therefore, the production method requires a large furnace and a long time for the sealing, and cannot produce insulators efficiently because a number of insulators that can be produced in the furnace in one sealing operation is restricted by an inner volume of the furnace.

SUMMARY OF THE INVENTION

An object of the present invention is to obviate the above drawbacks.

Another object of the present invention is to provide a lightning arrestor insulator having a high reliability and not having accidents in a power distribution line at a normal working voltage, which hence can reduce troubles caused by lightning.

Another object of the present invention is to provide a lightning arrestor insulator having an excellently fixed and airtightly sealed discharge gap portion.

Still another object of the present invention is to provide a lightning arrestor insulator having an excellently fixed and airtightly sealed arrestor ZnO element device.

A further object of the present invention is to provide a lightning arrestor insulator having both the excellently fixed and airtightly sealed discharge gap portion and the excellently fixed airtightly sealed arrestor ZnO element device.

A still further object of the present invention is to provide a method of producing a lightning arrestor insulator having electrodes and an arrestor ZnO element device in a body of the insulator, wherein the fixing and sealing of the arrestor ZnO element device composed of an arrestor ZnO element and electrically conductive covers, actings as the electrodes by means of an inorganic glass, can be put into effect simply by partial heating of the insulator.

Another object of the present invention is to provide a method of producing a lightning arrestor insulator having a lightning arrestor function, an airtight sealing property, and an electrical insulative property promptly by a simple and economical apparatus, and which can, if desired, control freely an environmental atmosphere around an arrestor ZnO element device built therein.

The present invention is a lightning arrestor insulator having a discharge gap portion and an arrestor ZnO element device both built in a body of the insulator. The insulator body comprises projected discharge electrodes arranged in the inside of the insulator body. The discharge gap portion is formed of a heat resistant protrusion arranged in the inside of the insulator body and surrounds the discharge electrodes. A pair of metal plates and/or electrically conductive ceramic plates sandwich the protrusion from both sides thereof and are electrically connected to the discharge electrodes. The pair of plates are joined and airtightly sealed to the protrusion via an inorganic glass.

The heat resistant protrusion may be a separate or integral part of the insulator body.

In another aspect, the present invention is also a lightning arrestor insulator having electrodes and an arrestor ZnO element device both built in a body of the insulator. The arrestor ZnO element device is formed of an arrestor ZnO element. The insulator body surrounds the arrestor ZnO element, and metallic covers and/or electrically conductive ceramic covers act as the electrodes and sandwich the arrestor ZnO element from both sides thereof. The covers are joined and airtightly sealed via an inorganic glass.

The present invention is also a method of producing a lightning arrestor insulator having an arrestor ZnO element device and a discharge gap portion both built in a body of the insulator, wherein a pair of metal plates and/or electrically conductive ceramic plates are electrically connected to projected discharge electrodes, disposed to sandwich and contact with a protrusion surrounding the discharge electrodes via an inorganic glass, and then heated by induction heating to melt the inorganic glass so as to join the pair of metal and/or electrically conductive ceramic plates and the protrusion by the molten glass, thereby to form an airtight sealing of the discharge gap portion.

The formed airtight sealing of the discharge gap portion has a high reliability in that the pair of plates having the discharge electrodes is directly joined to the protrusion by means of an inorganic glass.

By this arrangement, the lightning arrestor insulator of the present invention exhibits equivalent functions to those of conventional lightning arrestor insulators, and still prevents accidents in a power distribution line at a normal working voltage as well as hygromeration of the discharge gap portion due to accidental deterioration of the airtight sealing of the discharge gap, because the discharge gap portion is integrally fixed and airtightly sealed to the insulator body.

As a result, the lightning arrestor insulator of the present invention can widely decrease troubles caused by lightnings and increase reliability of power supply.

In the case of joining the discharge gap portion and the insulator body via the pair of plates by means of an inorganic glass, the pair of plates is heated by induction heating and the glass is substantially solely melted to airtightly seal the discharge gap portion, so that the temperature of the whole insulator is not increased. Therefore, a known phenomenon can not occur such that an inner pressure within the discharge gap is left reduced after solidification of the molten glass which is always seen in a conventional method of joining the discharge gap portion and the insulator body by heating the whole of the insulator, and the inner pressure within the discharge gap portion is substantially not reduced even after the formation of the airtightly sealed discharge gap portion. As a result, as compared with a necessity of increasing a distance between the discharge electrodes corresponding to a decrease of the inner pressure within the discharge gap portion in conventional methods for obtaining a constant discharge, voltage can be obviated, so that the distance between the discharge electrodes can be made small, and the lightning protective insulators can be produced cheaply without requiring conventional post treatments of controlling the inner pressure within the discharge gap through a hole and sealing the hole.

The present invention is also a method of producing a lightning arrestor insulator having electrodes and an arrestor ZnO element device formed of an arrestor ZnO element and metallic covers and/or electrically conductive ceramic covers acting as the electrodes airtightly fixed and sealed in a cavity of the insulator body. Covers are provided on the upper and bottom surfaces of the ZnO element, mounted and pressed on the insulator body via an inorganic glass, and then the glass is heated and melted by induction heating so as to form an airtight fixing and sealing between the covers and the insulator body after solidification of the molten glass.

In this method, airtight sealing and fixing of the covers can be achieved by partial heating of the insulator, and an environmental atmosphere around the ZnO element can be adjusted in that the covers are made of an electrically conductive material and induction heated by a high frequency induction heating, for example.

BRIEF DESCRIPTION OF THE DRAWINGS

For a better understanding of the present invention, reference is made to the accompanying drawings, in which.

NUMBERINGS IN THE DRAWINGS

Figure 1A:
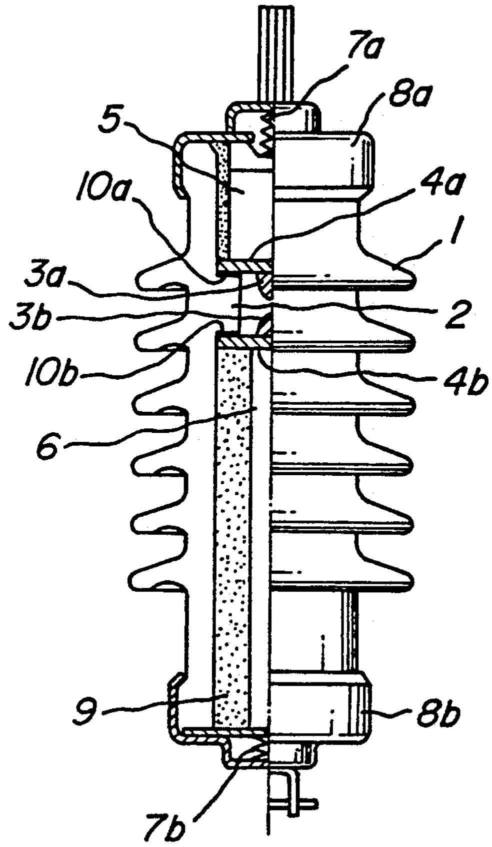
FIGS. 1*a* and 1*b* are a partial cross-sectional view of an example of the lightning arrestor insulator of the present invention and an enlarged cross-sectional view of the discharge gap portion thereof, respectively.

1 . . . insulator body
1*a* . . . upper end of insulator body 1
1*b* . . . lower end of insulator body 1
2 . . . protrusion
3*a*, 3*b* . . . discharge electrode
4*a*, 4*b* . . . metal plate
5 . . . arrestor ZnO element
6 . . . electrically conductive member
7*a*, 7*b* . . . resilient member
8*a*, 8*b* . . . metallic cap
9 . . . filler
10*a*, 10*b* . . . inorganic glass
11*a*, 11*b* . . . tapered surface
12*a*, 12*b* . . . electrically conductive ceramic plate
13 . . . induction coil
14 . . . pressing portion
15 . . . auxiliary stainless rod
16 . . . ceramic cylinder
17*a*, 17*b* . . . metallic or electrically conductive ceramic cover
20 . . . inorganic fibers
21 . . . resilient electrically conductive material

DESCRIPTION OF PREFERRED EMBODIMENTS

Figure 1B:
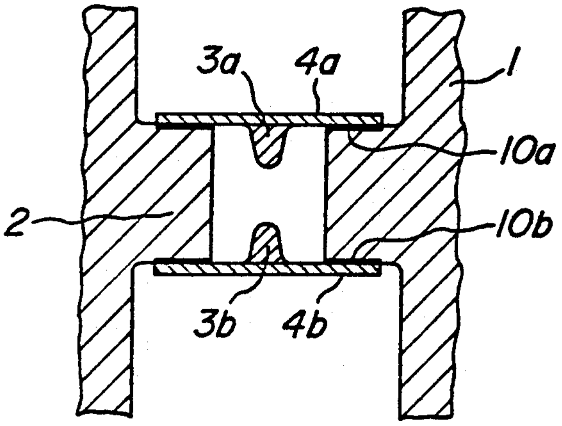

Referring to FIGS. 1*a* and 1*b* showing an embodiment of the present insulator, an insulator body 1 is provided with a cylindrical protrusion 2 integrally formed with the insulator body 1 at the inner upper portion thereof, the protrusion 2 is sandwiched by metal plates 4*a*, and 4*b* having projected discharge electrodes 3*a* and 3*b* and airtightly joined and sealed by inorganic glasses 10*a* and 10*b*, to form a discharge gap portion as shown in FIG. 1*b*. The discharge gap portion is provided with an arrestor ZnO element 5 thereabove, and an electrically conductive member 6 therebelow, arranged in this order, and the ZnO element 5 and the electrically conductive member 6 are connected to the insulator body 1 via resilient members 7*a* and 7*b* by metallic caps 8*a* and 8*b*, to form a lightning arrestor insulator of the present invention. In the spaces formed between the insulator body 1 and the ZnO element 5 and between the insulator body 1 and the electrically conductive member 6 is filled a filler 9 such as inorganic fibers. As the metal plates 4a and 4b, at least one of Kovar, stainless steel, aluminum, nickel, nickel-iron alloy and silver is used. Preferably, those metals having thermal expansion coefficients approximately to that of the insulator body 1 are used.

Figure 2A:
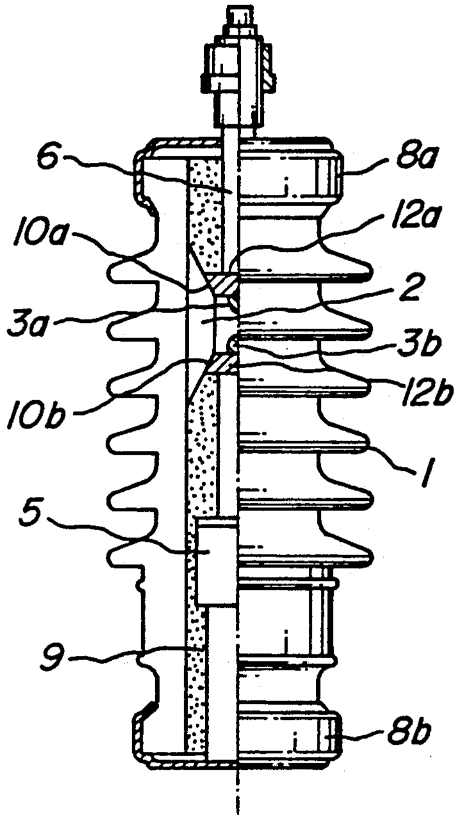
FIGS. 2*a* and 2*b* are a partial cross-sectional view of another example of the lightning arrestor insulator of the present invention and an enlarged cross-sectional view of the discharge gap portion thereof, respectively.
Figure 2B:
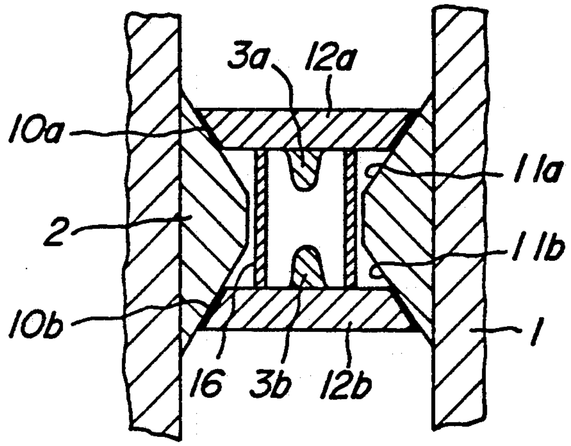

Referring to FIGS. 2a and 2b showing another embodiment of the present insulator, the same elements with FIGS. 1a and 1b are numbered with the same reference numbers, and explanations thereof are omitted. In this which is, different from the embodiment shown in FIGS. 1a and 1b, the protrusion 2 comprising tapered surfaces 11a and 11b separately made from the insulator body 1, and the tapered surfaces 11a and 11b are joined to electrically conductive ceramic plates 12a and 12b via inorganic glasses 10a and 10b, to form a discharge gap portion as shown in FIG. 2b. Further, in this embodiment a ceramic cylinder 16 is disposed between the electrically conductive ceramic plates 12a and 12b to surround the discharge electrodes 12a and 12b so as to reinforce the strength of the discharge gap portion. In addition, the ZnO element 5 and the electrically conductive member 6 are arranged in a different order in the cavity of the insulator body 1, however, this embodiment can achieve similar effects as those of the embodiment of FIG. 1. As the electrically conductive plates 12a and 12b, preferable use is made of at least one of zirconium boride, zinc oxide, stannous oxide, graphite, and silicon carbide.

Figure 3A:
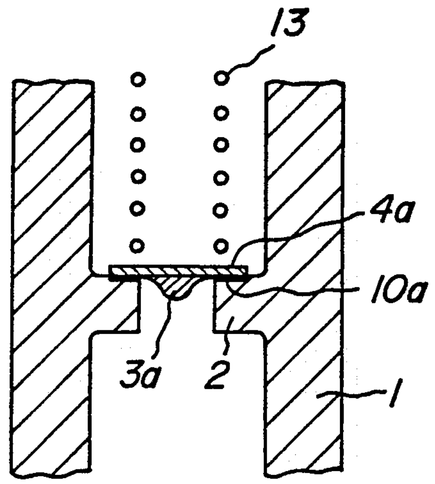
FIGS. 3*a* and 3*b* are explanational views illustrating the method of producing the lightning arrestor insulator having a built-in discharge gap portion of the present invention, respectively.
Figure 3B:
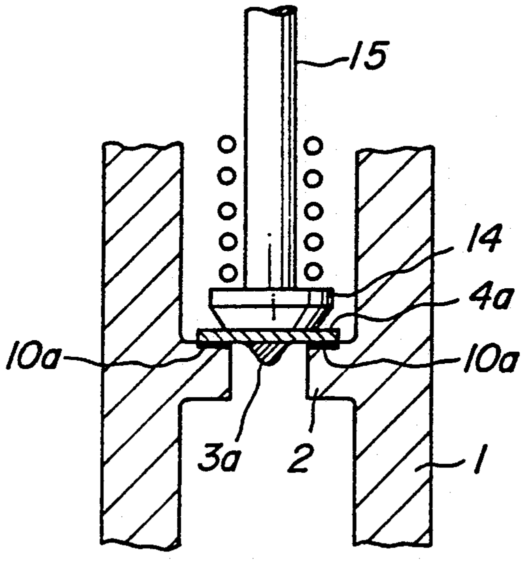

Referring to FIGS. 3a and 3b, each showing another embodiment of the present insulator, a metal plate 4a having a projected discharge electrode 3a is disposed on a protrusion 2 via an inorganic glass 10a in such a fashion that the discharge electrode 3a comes to face the protrusion 2, then an induction coil 13 is mounted on the metal plate 4a, and an electric current is passed through the induction coil 13 to heat the inorganic glass 10a by induction heating so as to join the metal plate 4a to the protrusion 2, as shown in FIG. 3a. After completion of the joining of the metal plate 4a, the metal plate 4b is joined to the protrusion 2 in the same way to form a discharge gap portion.

In the embodiment shown in FIG. 3b, the metal plates 4a and 4b are joined to the protrusion 2 by using an auxiliary stainless steel rod 15 having a pressing portion 14 arranged through the cavity of the insulator body 2, in addition to the use of the induction coil 13. This embodiment is more preferable, because the metal plates 4a and 4b can be pressed by the pressing portion 14 of the stainless steel rod 15 at the time of induction heating. In either embodiment, the inorganic glass 10a and 10b can be applied in a powder form or a paste form on the metal plates 4a and 4b on the protrusion 2. Instead of the metal plates used in the above embodiments of induction heating, electrically conductive ceramic plates or a pair of metal and electrically conductive ceramic plates can be used in the similar way to achieve the airtight fixing and sealing of the discharged gap portion to the same extent by means of the inorganic glass.

Figure 4:
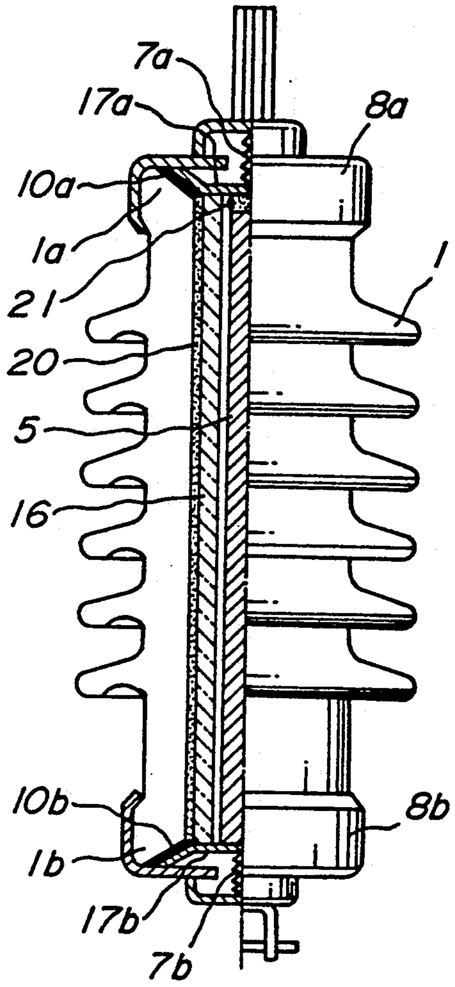
FIG. 4 is a schematic view partly in cross-section of an example of the lightning arrestor insulator of the present insulator.

Referring to FIG. 4 showing an embodiment of a lightning arrestor insulator of in the present invention, the insulator body 1 accommodates in its cavity a columnar arrestor ZnO element 5 consisting essentially of ZnO in an airtight state to form a lightning arrestor insulator of the present invention. More particularly, the upper and the lower end portions 1a and 1b of the insulator body 1 are respectively sealed airtightly by metallic covers 17a and 17b acting as electrodes via inorganic glasses 10a and 10b. A ceramic cylinder 16 and inorganic fibers 20 are disposed as reinforcing members in a space between the side wall of the arrestor ZnO element 5 and the inner wall of the insulator body 1 for protecting the insulator body by mitigating an increase of the inner pressure caused by an extraordinarly large current due to direct hit by lightning through a deteriorated ZnO element. Further, a resilient electrically conductive material 21 is disposed between the arrestor ZnO element 5 and the upper end cover 17a, in order to mitigate an external stress which is always exerted on the lightning arrestor insulator from the exterior. In this embodiment, the covers 17a and 17b function as the electrodes, so that the projected electrodes as shown in FIG. 1b may be dispensed with.

Figure 5:
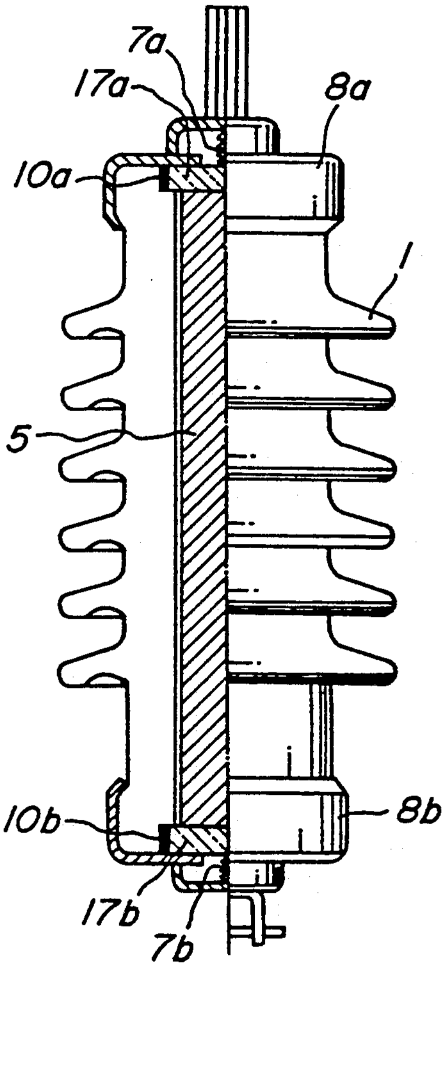
FIG. 5 is a schematic view partly in cross-section of another example of the lightning arrestor insulator of the present insulator.

Referring to FIG. 5, showing another embodiment of a lightning arrestor insulator of the present invention, the upper and the lower end portions of the insulator body 1 are sealed airtightly by electrically conductive ceramic covers 17a and 17b via an inorganic glass 10a and 10b, the covers acting as the electrodes.

In either structure of FIGS. 4 and 5, the upper and the lower end portions of the insulator body 1 are sealed airtightly to the metallic or the electrically conductive ceramic covers 17a and 17b via the inorganic glass 10a and 10b. Therefore, an inorganic glass has to be applied in various methods on the surfaces of the metallic covers and/or the ceramic covers which are to be contacted to each other. Illustrative examples of such application methods are heretofore known methods of directly applying a glass powder, a spray method, a paste method, and a tape method. After the application of the glass, the upper cover 17a and the lower cover 17b are mounted on the arrestor ZnO element 5 and the insulator body 1 from both sides thereof, pressed thereon, and induction heated to melt the inorganic glass 10a and 10b so as to form airtight sealings between the upper metallic cover 17a and the upper end 1a of the insulator body 1 and between the lower metallic cover 17b and the lower end 1b of the insulator body 1 for the embodiment shown in FIG. 4.

For the heating of the glass, a high frequency induction heating of the upper and the lower covers can be adopted for the covers made of an electrically conductive material. If the heating is effected by high frequency induction heating, a heating apparatus of a large scale is not necessary, and partial heating of insulators solely at the covers can be effected. An environmental atmosphere and an inner pressure of the atmosphere around the arrestor ZnO element 5 can be adjusted freely. Thus, the inner pressure can be adjusted to a preferable pressure of 1–10 atm, and a highly electrically insulative gas, such as $SF_6$, can be used and sealed as the atmosphere. In this case, the portions of the insulator to be heated or restricted, so that fiber reinforced plastics (FRP) can be used as the reinforcing member 16. In order to enhance the joining, preferably, the metallic covers are preliminarily heated up to 800°–1,000° C. in an oxidizing atmosphere to form a coating of an oxide on the surfaces thereof. More preferably, the portions of the covers to be joined are preliminarily coated with an inorganic glass and fired prior to the joining.

Hereinafter, the explanations will be made in more detail with reference to examples.

EXAMPLE 1

Inorganic glasses having the compositions and the characteristic properties as shown in the following Table 1 are used in combination with various metallic plates as shown in the following Table 2, and induction heated to form discharge gap portions of the shapes as described in Table 2. Thus formed discharge gap portions, and those after subjected to a cooling and heating test of thrice reciprocal cooling at −20° C. and heating at 80° C., are tested in an airtight seal test by means of He gas leakage measurement. The results are shown also in Table 2. In Table 2, symbol O represents those insulators that did not show a leakage of He gas, and symbol × represents those insulators that show a leakage of He gas. A condition of the He gas leakage test is $1\times10^{-9}$ atm. cc/sec or more.

TABLE 1

| Glass Type | A | B | C | D | E | F | G | H | I |
|---|---|---|---|---|---|---|---|---|---|
| CTE* 30-250° C. ($\times10^{-7}$/°C.) | 67.0 | 53.0 | 64.0 | 61.5 | 77.0 | 47 | 54 | 86 | 79 |
| Softening Point (°C.) | 375 | 400 | 400 | 415 | 360 | 630 | 703 | 448 | 470 |
| Working Temperature (°C.) | 450 | 460 | 450 | 450 | 410 | 750–800 | 850–950 | 520–560 | 630–660 |
| Composition System | $PbO.B_2O_3$ | $PbO.B_2O_3$ | $PbO.B_2O_3$ | $PbO.B_2O_3$ | $PbO.B_2O_3$ | $B_2O_3.ZnO$ | $B_2O_3.BaO$ | $B_2O_3.ZnO$ | $B_2O_3.ZnO$ |

*CTE is an abbreviation of thermal expansion coefficient

TABLE 2

| Test No. | Shape in FIG. 1 | Metal Plate: Kind | Metal Plate: Thickness (mm) | Glass Type | Temperature for joining (°C.) | Test Result: Airtight Sealness | Test Result: Airtight Sealness after the Cooling and Heating |
|---|---|---|---|---|---|---|---|
| 1 | a | Kovar | 0.5 | A | 460 | O | O |
| 2 | a | Kovar | 1.0 | A | 460 | O | O |
| 3 | a | Kovar | 1.5 | A | 460 | O | O |
| 4 | b | Stainless (SUS304) | 0.5 | I | 470 | O | O |
| 5 | b | Stainless (SUS304) | 1.0 | I | 470 | O | O |
| 6 | b | aluminum | 0.5 | E | 420 | O | O |
| 7 | b | aluminum | 1.0 | E | 420 | O | O |
| 8 | a | nickel | 1.0 | B | 470 | O | O |
| 9 | a | nickel-iron alloy | 1.0 | B | 470 | O | O |
| 10 | a | silver | 1.0 | A | 460 | O | O |
| 11 | b | silver | 1.0 | A | 460 | O | O |
| Reference-1 | a | copper | 0.5 | A | 460 | X | — |
| Reference-2 | a | niobium | 0.5 | I | 670 | X | — |

As seen clearly from the results of Table 2, the metallic plates are substantially completely joined and sealed by means of inorganic glasses. However, the combinations of the copper plate and the $PbO.B_2O_3$ series glass of type A, and the niobium plate and the $B_2O_3.ZnO$ series glass of type I, are insufficiently sealed, showing a leakage of He gas.

EXAMPLE 2

The various inorganic glasses shown in the above Table 1 are used in combination with various electrically conductive ceramic plates as shown in the following Table 3 and induction heated to form discharge gap portions. Thus formed discharge gap portions, and those after the cooling and heating test, are tested on the same airtight seal test as in Example 1. The results are shown in the following Table 3.

TABLE 3

| Test No. | Shape in FIG. 1 | Metal Plate: Kind | Metal Plate: Thickness (mm) | Glass Type | Temperature for joining (°C.) | Test Result: Airtight Sealness | Test Result: Airtight Sealness after the Cooling and Heating |
|---|---|---|---|---|---|---|---|
| 12 | a | zirconium boride | 5 | B | 470 | O | O |
| 13 | a | zirconium boride | 10 | B | 470 | O | O |
| 14 | a | zinc oxide | 5 | C | 460 | O | O |
| 15 | a | zinc oxide | 5 | A | 460 | O | O |
| 16 | a | zinc oxide | 5 | F | 800 | O | O |
| 17 | a | graphite | 5 | D | 470 | O | O |
| 18 | a | graphite | 10 | D | 470 | O | O |
| 19 | a | silicon carbide | 5 | B | 470 | O | O |
| 20 | a | silicon carbide | 5 | F | 800 | O | O |
| Reference-3 | a | molybdenum silicide | 5 | E | 420 | X | — |
| Reference-4 | a | molybdenum silicide | 5 | I | 670 | X | — |
| Reference-5 | a | tungsten carbide | 5 | D | 470 | X | — |
| Reference-6 | a | chromium oxide | 5 | G | 950 | X | — |

As seen clearly from the results of the above Table 3, the electrically conductive ceramic plates are substantially completely joined and sealed by means of inorganic glasses. However, the combinations of the plate of molybdenum silicide, tungsten carbide, or chromium oxide and the glasses of Reference 3-6, are insufficiently sealed, showing a leakage of He gas.

EXAMPLE 3

In order to examine the state of the induction heating in the method of the present invention, the various inorganic glasses shown in the above Table 1 are disposed between the protrusions of the insulator bodies and metal plates or electrically conductive ceramic plates shown in the following Table 4 in the forms as described in Table 4, and induction heated in conditions as described also in Table 4 to form discharge gap portions. Thus formed discharge gap portions, and those after the cooling and heating test, are tested on the same airtight seal test as in Example 1. The results are shown in the following Table 4.

TABLE 4

| Test No. | Shape in FIG. 1 | Metal or Conductive Ceramics: Kind | Metal or Conductive Ceramics: Thickness (mm) | Inorganic Glass: Type | Inorganic Glass: State | Induction Heating | Heating Condition: Voltage (V) | Heating Condition: Current (A) | Heating Condition: Time (sec) | Test Result: Airtight Sealness | Test Result: Airtight Sealness after the Cooling and Heating |
|---|---|---|---|---|---|---|---|---|---|---|---|
| 1 | a | Kovar | 0.5 | A | powder | direct | 100 | 10 | 40 | O | Δ |
| 2 | a | Kovar | 1.0 | A | powder | direct | 100 | 10 | 40 | O | Δ |
| 3 | a | Kovar | 0.5 | A | powder | direct | 100 | 10 | 90 | O | O |
| 4 | a | Kovar | 0.5 | A | paste | direct | 100 | 10 | 40 | O | O |
| 5 | a | Kovar | 1.0 | A | paste | direct | 100 | 10 | 40 | O | O |
| 6 | a | Kovar | 0.5 | A | paste | auxiliary stainless rod | 100 | 10 | 20 | O | O |
| 7 | a | Kovar | 1.0 | A | paste | auxiliary stainless rod | 100 | 10 | 20 | O | O |
| 8 | a | zirconium boride | 5.0 | B | powder | auxiliary stainless rod | 100 | 10 | 240 | O | O |
| 9 | a | zirconium boride | 5.0 | B | paste | auxiliary stainless rod | 100 | 10 | 90 | O | O |
| 10 | a | zirconium boride | 10.0 | B | paste | auxiliary stainless rod | 100 | 10 | 100 | O | O |
| 11 | a | zirconium boride | 10.0 | B | paste | direct | 100 | 10 | 240 | O | O |

As seen from the results of Table 4, substantially completely joined and sealed discharge gap portions can be formed. However, in case where a stainless steel rod is not used and induction heating is effected for a short time using powdery inorganic glass, the formed discharge gap portions show some leakage of He gas in the airtight sealness test after the cooling and heating.

EXAMPLE 4

The lightning arrestor insulators as shown in FIGS. 1*a* and 1*b* are produced by preparing arrestor ZnO element devices of Test Nos. 1-6 of the following Table 5 by using an inorganic glass and various sealing structures and structural conditions as shown in the following Table 5.

TABLE 5

| Test No. | Seal Method | Firing Method | Sealing Cover | Reinforcing Material | Adjustment of Environment | Firing Time for Sealing |
|---|---|---|---|---|---|---|
| 1 | Sealing of cover having temporary baked glass | Partial heating | Kovar | FRP | None (astmospheric) | 15 min |
| 2 | Sealing of cover having temporary baked glass | Partial heating | 42Ni alloy | Alumina | $SF_6$ 1 atm | 16 min |
| 3 | Sealing of cylinder end having glass applied | Partial heating | Kovar | FRP | $N_2$ 1 atm | 18 min |
| 4 | Sealing of cover having temporary baked glass | Partial heating | aluminum | FRP | $SF_6$ 1 atm | 15 min |
| 5 | Sealing of cover having temporary baked glass | Partial heating | zirconium boride | alumina | $N_2$ 10 atm | 25 min |
| 6 | Sealing of cover having temporary baked glass | Partial heating | Kovar | FRP | $N_2$ 1 atm | 15 min |
| 7 (conventional) | Casting of molten glass | Total heating | None | None | None | 36 hrs |

As seen from the above Table 5, various sealing covers and reinforcing members can be used, and the environmental atmosphere around the ZnO element can be adjusted. These sealing covers and reinforcing members can be sealed in a short time by high frequency induction heating of the electrically conductive sealing covers.

As is apparent from the above foregoing explanations, the lightning arrestor insulator of the present invention has a discharge gap portion formed by directly joining a protrusion arranged in the inside of the insulator body and metal plates and/or electrically conductive ceramic plates having discharge electrodes by means of an inorganic glass, so that lightning arrestor insulators having a highly reliable airtightly sealed discharge gap portion can be obtained. As a result, accidents in a power service line at a normal working voltage can be substantially eliminated, and damages caused by hygromeration can be noticeably decreased, so that electric power can be supplied with widely improved reliability.

Also, the lightning arrestor insulator of the present invention has electrodes and an arrestor ZnO element device formed by directly joining the inside of the insulator body and metallic covers and/or electrically conductive covers acting as the electrodes by means of an inorganic glass, so that lightning arrestor insulators having a highly reliable airtightly sealed arrestor ZnO element device can be obtained. As a result, accidental troubles in a power service line at a normal working voltage can be substantially eliminated, and damages caused by lightning can be noticeably decreased, so that electric power can be supplied with widely improved reliability, from this aspect too.

According to the method of the present invention, the discharge gap portion is formed and sealed airtightly by partial heating of the lightning arrestor insulator by means of an induction heating, so that temperature rise of the whole insulator can be avoided. As a result, an inner pressure within the discharge gap portion is not changed substantially after the airtight sealing, and lightning arrestor insulators of the desired properties can easily be obtained.

Also, according to the method of the present invention, the arrestor ZnO element device is formed and sealed airtightly by partial heating of the lightning arrestor insulator by means of an induction heating solely of the upper and lower electrically conductive covers sandwiching the arrestor ZnO element via an inorganic glass, so that a position of breakage of the insulator at the time that lightning hits can be restricted to the covers accommodating the arrestor ZnO element. As a result, a crack formed in the covers can be prevented from developing into the insulator body, and discharge characteristic properties of the insulator at the time of short-cut of an extraordinary excessive electric current can be improved.

In addition, a heating device in an apparatus for producing the lightning arrestor insulator can be minimized, and an environmental atmosphere around the arrestor ZnO element can be adjusted to desired ones.

Though the contacting end surfaces of the upper and lower covers and the insulator body are shown as tapered surfaces in the above embodiments, the contacting end surfaces may have other shapes, such as shown in FIG. 5.

The present invention is not limited to a suspension type lightning arrestor insulator, and is clearly applicable to other shapes of lightning arrestor insulators.

Although the present invention has been explained with specific examples, it is of course apparent to those skilled in the art that various changes and modifications thereof are possible without departing from the broad spirit and aspect of the present invention as defined in the appended claims.

What is claimed is:

1. A lightning arrestor insulator having a discharge gap portion and an arrestor ZnO element device both within a body of the insulator, comprising: projected discharge electrodes arranged in the inside of the insulator body, the discharge gap portion being formed of a heat resistant protrusion arranged in the inside of the insulator body and surrounding the discharge electrodes, the protrusion being a separate or integral part of the insulator body;

a pair of metal plates and/or electrically conductive ceramic plates sandwiching the protrusion from both sides thereof and electrically connected to the discharge electrodes, the pair of plates being joined and airtightly sealed to the protrusion with an inorganic glass; and a ceramic cylinder surrounding the projected electrodes between the pair of plates for firmly supporting the pair of plates.

2. The lightning arrestor insulator of claim 1, wherein said lightning arrestor insulator is produced according to a method sequentially comprising the steps of:

electrically connecting said pair of metal and/or ceramic plates to said discharge electrodes;

arranging said discharge electrodes inside the insulator body such that said pair of metal and/or ceramic plates sandwich the ceramic cylinder and said protrusion surrounding the discharge electrodes with the inorganic glass therebetween; and melting the inorganic glass by induction heating to join said pair of metal and/or ceramic plates and said protrusion with the molten glass, thereby airtightly sealing the discharge gap portion.

3. A method of producing a lightning arrestor insulator having an arrestor ZnO element device and a discharge gap portion both within a body of the insulator, sequentially comprising the steps of:

electrically connecting a pair of metal plates and/or electrically conductive ceramic plates to projected discharge electrodes;

arranging said discharge electrodes inside the insulator body such that said pair of metal and/or ceramic plates sandwich a protrusion surrounding the discharge electrodes with an inorganic glass therebetween; and melting the inorganic glass by induction heating to join said pair of metal and/or ceramic plates and the protrusion by the molten glass, thereby airtightly sealing the discharge gap portion.

4. A method of producing a lightning arrestor insulator having electrodes and an arrestor ZnO element device formed of an arrestor ZnO element and metallic covers and/or electrically conductive ceramic covers acting as the electrodes, airtightly fixed and sealed in a cavity of the insulator body, sequentially comprising the steps of:

positioning said covers on the upper and bottom surfaces of the ZnO element;

mounting and pressing said covers on the insulator body with an inorganic glass; and melting said glass by induction heating so as to form an airtight seal between the covers and the insulator body after solidification of the molten glass.

5. A lightning arrestor insulator comprising:

a hollow insulator body;

an arrestor ZnO element device disposed within the insulator body;

projected discharge electrodes disposed within the insulator body;

a heat resistant protrusion disposed within the insulator body and surrounding said discharge electrodes, thereby forming a discharge gap portion;

metallic caps arranged at the top and the bottom of the insulator body;

a resilient member disposed between said ZnO element device and an adjacent one of said metallic caps; and a pair of metal and/or electrically conductive ceramic plates sandwiching the protrusion from both sides thereof and electrically connected to said discharge electrodes, said plates being joined and airtightly sealed to the protrusion with an inorganic glass.

6. The lightning arrestor insulator of claim 5, wherein the protrusion is integrally formed with the insulator body.

7. A lightning arrestor insulator comprising:

a hollow insulator body;

an arrestor ZnO element disposed within the insulator body and surrounded thereby, forming a space therebetween;

metallic and/or electrically conductive ceramic covers acting as electrodes and sandwiching said ZnO element therebetween, said covers being joined and airtightly sealed to the insulator body with an inorganic glass; and a resilient, electrically conductive material disposed between said ZnO element and an adjacent one of said covers.

8. The lightning arrestor insulator of claim 15, further comprising a reinforcing member disposed around said ZnO element device.

9. The lightning arrestor insulator of claim 15, wherein a filler is interposed between said ZnO element and the insulator body.

* * * * *